United States Patent
Devarasetty

(10) Patent No.: US 10,735,110 B2
(45) Date of Patent: Aug. 4, 2020

(54) METHODS, SYSTEMS, AND COMPUTER READABLE MEDIA FOR TESTING AND MODELING BEAMFORMING CAPABILITIES OF A DEVICE UNDER TEST

(71) Applicant: Keysight Technologies, Inc., Santa Rosa, CA (US)

(72) Inventor: Prasada Rao Devarasetty, Cary, NC (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/214,021

(22) Filed: Dec. 7, 2018

(65) Prior Publication Data

US 2020/0186261 A1   Jun. 11, 2020

(51) Int. Cl.
  *H04B 17/00* (2015.01)
  *H04B 7/06* (2006.01)
  *H04W 74/08* (2009.01)
  *H04L 25/02* (2006.01)
  *H04L 5/00* (2006.01)

(52) U.S. Cl.
  CPC ....... *H04B 17/0085* (2013.01); *H04B 7/0617* (2013.01); *H04B 7/0626* (2013.01); *H04L 5/0048* (2013.01); *H04L 25/0226* (2013.01); *H04W 74/0833* (2013.01)

(58) Field of Classification Search
  None
  See application file for complete search history.

(56) References Cited

U.S. PATENT DOCUMENTS

| | | |
|---|---|---|
| 5,892,482 A | 4/1999 | Coleman, Jr. et al. |
| 7,349,670 B2 | 3/2008 | Mlinarsky et al. |

(Continued)

FOREIGN PATENT DOCUMENTS

| | | |
|---|---|---|
| EP | 2 330 843 A1 | 6/2011 |
| EP | 2 512 173 A1 | 10/2012 |

(Continued)

OTHER PUBLICATIONS

Ramalingam, Manoharan, "5G NR Beam Management and Beam Scheduling (everything about beams)," Linkedin.com, pp. 1-5 (Dec. 7, 2018).

(Continued)

*Primary Examiner* — Brian S Roberts

(57) ABSTRACT

Methods, systems, and computer readable media for testing and modeling the beamforming capabilities of a device under test (DUT) are disclosed. The method includes receiving, from a DUT, system information that correlates a plurality of resources to a plurality of synchronization system (SS) blocks transmitted by the DUT and receiving, from the DUT, the plurality of SS blocks. In response to receiving the plurality of SS blocks, the method further includes sending a random access procedure (RACH) message from an emulated user equipment to the DUT via a resource that is correlated per the system information to a predefined SS block that is specified in a beam model. The method also includes analyzing a beam switch indication message sent by the DUT to confirm that the DUT has restricted communication to the emulated user equipment via a beam signal corresponding to the predefined SS block.

20 Claims, 7 Drawing Sheets

(56) References Cited

U.S. PATENT DOCUMENTS

| | | |
|---|---|---|
| 7,890,821 B2 | 2/2011 | Music et al. |
| 7,948,254 B2 | 5/2011 | Olgaard et al. |
| 8,229,416 B2 | 7/2012 | Akman et al. |
| 8,565,193 B2 | 10/2013 | Ylitalo |
| 8,805,290 B2 | 8/2014 | Guo et al. |
| 8,995,511 B2 | 3/2015 | Reed |
| 9,001,918 B2 | 4/2015 | Taori et al. |
| 9,002,290 B2 | 4/2015 | Olgaard |
| 9,077,415 B2 | 7/2015 | Josiam et al. |
| 9,083,454 B2 | 7/2015 | Wicker, Jr. et al. |
| 9,154,979 B2 | 10/2015 | Asokan et al. |
| 9,204,325 B2 | 12/2015 | Subramanian et al. |
| 9,294,324 B2 | 3/2016 | Schmidt |
| 9,407,381 B2 | 8/2016 | Kyosti et al. |
| 9,488,685 B2 | 11/2016 | Kyosti et al. |
| 9,660,739 B2 | 5/2017 | Reed |
| 9,661,517 B2 | 5/2017 | Stott et al. |
| 9,742,508 B1 | 8/2017 | Kyosti et al. |
| 9,955,371 B1* | 4/2018 | Koebele ............ H04W 56/0025 |
| 10,033,473 B1 | 7/2018 | Kyrolainen et al. |
| 10,103,823 B1 | 10/2018 | Kyrolainen et al. |
| 10,110,326 B1 | 10/2018 | Kyrolainen et al. |
| 10,182,355 B1 | 1/2019 | Yan et al. |
| 10,455,606 B2 | 10/2019 | Bi et al. |
| 10,484,056 B2 | 11/2019 | Garcia |
| 2003/0195735 A1 | 10/2003 | Rosedale et al. |
| 2006/0229018 A1 | 10/2006 | Mlinarsky et al. |
| 2006/0233111 A1 | 10/2006 | Wright |
| 2007/0243826 A1 | 10/2007 | Liu |
| 2009/0094492 A1 | 4/2009 | Music et al. |
| 2009/0262719 A1 | 10/2009 | Shim et al. |
| 2010/0075678 A1 | 3/2010 | Akman et al. |
| 2010/0285753 A1 | 11/2010 | Foegelle |
| 2011/0200084 A1 | 8/2011 | Griesing et al. |
| 2011/0293028 A1 | 12/2011 | Panicker et al. |
| 2011/0306306 A1 | 12/2011 | Reed |
| 2012/0100813 A1 | 4/2012 | Mow et al. |
| 2012/0309323 A1 | 12/2012 | Guo et al. |
| 2013/0155872 A1 | 6/2013 | Subramanian et al. |
| 2013/0155878 A1 | 6/2013 | Deng et al. |
| 2013/0208603 A1 | 8/2013 | Choi et al. |
| 2013/0210474 A1 | 8/2013 | Kyösti |
| 2013/0286860 A1 | 10/2013 | Dorenbosch et al. |
| 2014/0024318 A1 | 1/2014 | Sevindik et al. |
| 2014/0086075 A1 | 3/2014 | Asokan et al. |
| 2014/0140271 A1 | 5/2014 | Devarasetty et al. |
| 2014/0141728 A1 | 5/2014 | Devarasetty et al. |
| 2014/0187260 A1 | 7/2014 | Jiang et al. |
| 2014/0269527 A1 | 9/2014 | Asokan |
| 2015/0017928 A1 | 1/2015 | Griesing et al. |
| 2015/0092824 A1 | 4/2015 | Wicker, Jr. et al. |
| 2015/0257073 A1 | 9/2015 | Park et al. |
| 2016/0050569 A1* | 2/2016 | Olgaard ................ H04W 24/02 370/252 |
| 2016/0095104 A1 | 3/2016 | Chen et al. |
| 2016/0192353 A1 | 6/2016 | Abdoli et al. |
| 2016/0204507 A1 | 7/2016 | Karjalainen |
| 2016/0212641 A1 | 7/2016 | Kong et al. |
| 2016/0233970 A1* | 8/2016 | Reed ...................... H04B 17/29 |
| 2016/0285572 A1 | 9/2016 | Manghal et al. |
| 2016/0344490 A1 | 11/2016 | Foegelle |
| 2016/0373196 A1 | 12/2016 | Stott et al. |
| 2017/0019154 A1 | 1/2017 | Reed |
| 2017/0184698 A1 | 6/2017 | Rueth |
| 2017/0373773 A1 | 12/2017 | Jing et al. |
| 2018/0048399 A1 | 2/2018 | Thiruvarankan |
| 2018/0062971 A1 | 3/2018 | Kyosti et al. |
| 2018/0076907 A1* | 3/2018 | Naseef ................. H04B 17/102 |
| 2018/0098349 A1 | 4/2018 | Sun et al. |
| 2018/0123648 A1* | 5/2018 | Nagaraja ............... H04B 17/15 |
| 2018/0199359 A1 | 7/2018 | Cao et al. |
| 2018/0324023 A1* | 11/2018 | Zeng .................... H04J 11/0076 |
| 2019/0004102 A1* | 1/2019 | Gienger ............... G01R 29/105 |
| 2019/0044583 A1 | 2/2019 | Garcia |

FOREIGN PATENT DOCUMENTS

| | | |
|---|---|---|
| EP | 2 597 794 A1 | 5/2013 |
| WO | WO 2011/148030 A1 | 12/2011 |
| WO | WO 2015050974 A1 | 4/2015 |
| WO | WO 2016/209338 A1 | 12/2016 |
| WO | WO-2017/091713 A1 | 6/2017 |

OTHER PUBLICATIONS

Notice of Allowance and Fee(s) Due for U.S. Appl. No. 15/721,754 (dated Aug. 8, 2018).

Notice of Allowance and Fee(s) Due for U.S. Appl. No. 15/721,757 (dated May 23, 2018).

Giordani et al., "A Tutorial on Beam Management for 3GPP NR at mm Wave Frequencies," IEEE, pp. 1-22 (Apr. 5, 2018).

"Keysight Technologies Testing 5G: Data Throughput," Keysight Technologies, Inc., pp. 1-24 (Dec. 7, 2017).

Campos, Javier, "Understanding the 5G NR Physical Layer," Keysight Technologies, Inc., pp. 1-111 (Nov. 1, 2017).

Commonly assigned, co-pending U.S. Appl. No. 16/784,820 for "Methods, Systems, And Computer Readable Media For 5g Digital Beamforming Testing, " (unpublished, filed Feb. 7, 2020).

"5G/NR—Frame Structure," ShareTechnote, pp. 1-22 (Mar. 15, 2019).

"Bringing Field Testing Into the 5G Lab System Verification Life Cycle," VIAVI Solutions, pp. 1-8 (2019).

DeTomasi, Sheri, "Understanding 5G New Radio Bandwidth Parts, " Keysight Technologies Inc., pp. 1-7 (Oct. 31, 2018).

Ghosh, Amitabha, "5G New Radio (NR): Physical Layer Overview and Performance IEEE Communication Theory Workshop," pp. 1-38 (May 15, 2018).

"Seven Things You Need To Know About 5G New Radio", Keysight Technologies Inc., pp. 1 (Feb. 1, 2018).

Notice of Allowance and Fee(s) Due for U.S. Appl. No. 15/666,028 (dated Jun. 21,2019).

Non-Final Office Action for U.S. Appl. No. 15/666,028 (dated Jan. 24,2019).

Notice of Allowance and Fee(s) Due for U.S. Appl. No. 15/721,754 (dated Apr. 20, 2018).

Non-Final Office Action for U.S. Appl. No. 15/254,414 (dated Mar. 8, 2018).

Kyosti et al., "On Dimensions of OTA Setups for Massive MIMO Base Stations Radiated Testing," IEEE Access, pp. 5971-5981 (Oct. 6, 2016).

Jiann-Ching Guey et al., "Modeling and Evaluation of Beam Tracking Mobile Millimeter Wave Communication", 2015 IEEE 26th International Symposium on Personal, Indoor and Mobile Radio Communications-(PIMRC): Fundamentals and PHY, pp. 775-780. (2015).

Yu et al., "Radiated Two-Stage Method for LTE MIMO User Equipment Performance Evaluation," IEEE Transactions on Electromagnetic Compatbility, vol. 56, No. 6, pp. 1691-1696 (Dec. 2014).

Schirmer et al., "3D Wave-Field Synthesis for Testing of Radio Devices," The 8th European Conference on Antennas and Propagation, pp. 3394-3398 (2014).

Kyosit et al., "Channel Modelling for Multiple Over-the-Air MIMO Testing," Hindawi Publishing Corporation, International Journal of Antennas and Propagation, vol. 2012, Article ID 615954, pp. 1-11 (Mar. 2012).

Notice of Allowance and Fee(s) Due for U.S. Appl. No. 15/819,90 (dated Sep. 12, 2018).

Communication of the Extended Search Report for European Patent Applicaiton Serial No. 16814847.6 (dated Jul. 4, 2018).

Communication pursuant to Article 94(3) EPC for European Patent Application Serial No. 14 850 849.2 (dated Mar. 26, 2018).

Commonly-assigned, co-pending U.S. Appl. No. 15/819,90 for "Methods, Systems and Computer Readable Media for Testing an Air Interface Device by Simulating Multi-User Equipment (Multi-UE) Uplink Virtual Multiple Input Multiple Output (MIMO)," (Unpublished, filed Nov. 21, 2017).

(56) References Cited

OTHER PUBLICATIONS

Communication of the extended European search report for European Patent Application No. 14850849.2 (dated Apr. 19, 2017).

Notice of Allowanced and Fee(s) Due for U.S. Appl. No. 14/746,733 (dated Jan. 20, 2017).

"IXLOAD®—Wireless XAIR2," Data Sheet, Ixia, A Keysight Business, 915-2744-01-3071 Rev B, pp. 1-6 (2017).

Notice of Allowance and Fee(s) Due for U.S. Appl. No. 14/746,733 (dated Oct. 7, 2016).

Notification of Transmittal of the International Search Report and the Written Opinion of the International Searching Authority, or the Declaration for Internation Applicaion No. PCT/US2016/028320 (dated Jul. 26, 2016).

Communication of European publication number and information on the application of Aricle 67(3) EPC for European Patent Application No. 14850849.2 (dated Jul. 13, 2016).

Notice of Allowance and Fee(s) Due for U.S. Appl. No. 14/043,799 (dated Mar. 3, 2015).

Notification of Transmittal of the International Search Report and the Written Opinion of the International Searching Authority, or the Declaration for International Application No. PCT/US2014/058601 (dated Dec. 23, 2014).

Ex Parte Quayle Office Action for U.S. Appl. No. 14/043,799 (dated Dec. 3, 2014).

Doshi et al., "Network Design and Implementation using Emulation-Based Analysis," Military Communications Conference, IEEE, pp. 1-9 (2007).

"UL Virtual MIMO Scheduling," 3GPP TSG-RAN1, Meeting #43, R-051423, Nortel, pp. 1-7 (Nov. 7-11, 2005).

\* cited by examiner

METHODS, SYSTEMS, AND COMPUTER READABLE MEDIA FOR TESTING AND MODELING BEAMFORMING CAPABILITIES OF A DEVICE UNDER TEST

TECHNICAL FIELD

The subject matter described herein relates to network equipment testing. More particularly, the subject matter described herein relates to methods, systems, and computer readable media for testing and modeling beamforming capabilities of a device under test (DUT).

BACKGROUND

Wireless signals propagating in the millimeter wave (mmWave) band are susceptible to suffering from increased path loss and severe channel intermittency. For example, the blocking of mmWave band signals by common building materials (e.g., brick or mortar) or by other obstructions in the user's environment can lead to significant drops in transmitted signal strength. In an attempt to address these impairments, 5G new radio (NR) cellular networks provide a set of mechanisms by which user equipment (UE) devices and mmWave next generation Node Base (gNB) stations can establish highly directional transmission links through the use of high-dimensional phased arrays (e.g., multiple input output (MIMO) antenna arrays). Notably, the use of directional transmission links can be used to leverage the resulting beamforming gain, thereby sustaining an acceptable communication quality and throughput. These beamforming directional transmission links, however, require the transmitter and receiver beams to be precisely aligned through a set of operations known as beam management. These beams are fundamental to perform a variety of control tasks including i) the initial access for idle users, which allows a mobile user equipment to establish an optimum link connection with a gNB, and ii) beam tracking, for connected users, which enable beam adaptation schemes (e.g., handover, path selection, and radio link failure recovery procedures).

In 5G NR, the conventional wide beam-based cell sector coverage that is typically used with long term evolution (LTE) is not used. One disadvantage of the LTE-based wide beam coverage is that if the base station transmits a signal to a mobile terminal in a particular direction, the base station will transmit a cell sector wide signal using MIMO techniques that can affect the link budget and as well as introduce signal interference. In contrast, beam-based cell sector coverage is largely used in 5G NR. In particular, beam-based cell sector coverage increases the link budget and can, along with beamforming techniques, overcome the drawbacks exhibited by mmWave channel use. For example, beamforming combines the signals transmitted from multiple antenna elements in an antenna array, such that the combined signal level increases when several signal phases align (e.g., constructive interference). The signals from each antenna element are transmitted with a slightly different phase (delay) to produce a narrow beam that can be directed precisely towards the receiver. In 5G NR networks, the performance monitoring of the beam management used to conduct gNB-UE communications is necessary to effectively facilitate massive MIMO, particularly in mmWave frequencies. Namely, the gNB and user equipment are continuously acquiring, tracking, and switching the beams as needed in order to achieve the best communication performance. However, at present, there is no efficient way of emulating the aforementioned beam scanning, tracking and switching in 5G test environments.

Accordingly, there exists a need for methods, systems, and computer readable media for testing and modeling the beamforming capabilities of a gNB element.

SUMMARY

According to one aspect, the subject matter described herein includes a method for testing and modeling the beamforming capabilities of a device under test (DUT). The method includes receiving, from a DUT, system information that associates a plurality of beam transmitting antennas of the DUT with a plurality of beam reference signals (BRSs) transmitted by the DUT and receiving the plurality of BRS signals from the DUT. In response to receiving the plurality of BRSs, the method further includes sending a predefined beam selection information (BSI) set to the DUT that includes the fabricated beam signal strength values for each of the plurality of BRSs. The method also includes analyzing a beam switch indication message sent by the DUT to confirm that the DUT is utilizing a serving beam associated with a highest fabricated beam signal strength value indicated in the predefined BSI set.

In one example of the method, the fabricated beam signal strengths of the BRS signals included in the predefined BSI are specified in a beam model provided as input and are independent of the actual signal strengths of the plurality of BRS signals received from the DUT.

In one example of the method, wherein the method includes receiving a plurality of beam refinement reference signals (BRRSs) from the DUT.

In one example, the method includes, in response to receiving the plurality of BRRSs from the DUT, sending a predefined beam refinement information (BRI) set to the DUT indicating the fabricated beam signal strength for each of the plurality of BRRSs.

In one example of the method, the fabricated beam signal strengths of the BRRSs included in the predefined BRI set are specified in the beam model and are independent of the actual signal strengths of the plurality of BRRSs received from the DUT.

In one example, the method includes determining that the serving beam indicated in the beam switch indication message matches the serving beam corresponding to the BRS associated with the highest signal strength indicated in the BSI set.

In one example of the method, the DUT is a next generation node B (gNB).

According to one aspect, the subject matter described herein includes method for testing and modeling the beamforming capabilities of a device under test (DUT). The method includes receiving, from a DUT, system information that correlates a plurality of resources to a plurality of synchronization system (SS) blocks transmitted by the DUT and receiving, from the DUT, the plurality of SS blocks. In response to receiving the plurality of SS blocks, the method includes sending a random access procedure (RACH) message from an emulated user equipment to the DUT via a resource that is correlated per the system information to a predefined SS block that is specified in a beam model. The method further includes analyzing a beam switch indication message sent by the DUT to confirm that the DUT has restricted communication to the emulated user equipment via a beam signal corresponding to the predefined SS block.

In one example of the method, the predefined SS block is characterized by the RACH resource as having the greatest signal strength magnitude among the plurality of SS blocks transmitted by the DUT.

In one example of the method, the resource includes a RACH resource that is defined by at least one of a time slot and a frequency.

In one example of the method, the beam model that specifies the predefined SS block is received as input after the receiving of the system information.

In one example, the method further comprising i) receiving, from the DUT, system information that correlates the plurality of resources to the plurality of SS blocks and a plurality of CSI-RS signals transmitted by the DUT, ii) receiving the plurality of SS blocks and the plurality CSI-RS signals from the DUT, iii) in response to receiving the plurality of SS blocks and the plurality CSI-RS signals, sending from the emulated user equipment to the DUT, a plurality of fabricated NCSI-Rx values corresponding to the plurality of SS blocks based on the beam model to the DUT via uplink control information that is correlated per the system information to the predefined SS block that is specified in the beam model, and iv) analyzing a second beam switch indication message sent by the DUT to confirm that the DUT has restricted communication to the emulated user equipment via a beam signal corresponding to the predefined SS block.

In one example, the method includes transmitting, via an uplink channel from the emulated user equipment to the DUT, a sounding reference signal (SRS) signal that is fabricated in accordance to the beam model.

In one example of the method, the DUT sends a follow-up beam switch indication message to the emulated user equipment in response to receiving the fabricated SRS signal.

According to one aspect, the subject matter described herein includes a system for testing and modeling beamforming capabilities of a DUT operating in an initial access mode. The system includes a network test tool device comprising at least one processor, a memory, and a beamforming test engine that when stored in memory and executed by the at least one processor is configured for receiving, from a device under test (DUT), system information that correlates a plurality of resources to a plurality of synchronization system (SS) blocks transmitted by the DUT and receiving, from the DUT, the plurality of SS blocks. In response to receiving the plurality of SS blocks, the beamforming test engine is configured for sending a random access procedure (RACH) message from an emulated user equipment to the DUT via a resource that is correlated per the system information to a predefined SS block that is specified in a beam model. The beamforming test engine of the system is further configured for analyzing a beam switch indication message sent by the DUT to confirm that the DUT has restricted communication to the emulated user equipment via a beam signal corresponding to the predefined SS block.

In one example of the system, the predefined SS block is characterized by the RACH message as having the greatest signal strength magnitude among the plurality of SS blocks transmitted by the DUT.

In one example of the system, the resource includes a RACH resource that is defined by at least one of a time slot and a frequency.

In one example of the system, the beam model that specifies the predefined SS block is received as input after the receiving of the system information.

In one example of the system, the beamforming test engine is further configured to function in a connected mode that includes i) receiving, from the DUT, system information that correlates the plurality of resources to the plurality of SS blocks and a plurality of CSI-RS signals transmitted by the DUT, ii) receiving the plurality of SS blocks and the plurality CSI-RS signals from the DUT, iii) in response to receiving the plurality of SS blocks and the plurality CSI-RS signals, sending from the emulated user equipment to the DUT, a plurality of fabricated NCSI-Rx values corresponding to the plurality of SS blocks based on the beam model to the DUT via uplink control information that is correlated per the system information to the predefined SS block that is specified in the beam model, and iv) analyzing a second beam switch indication message sent by the DUT to confirm that the DUT has restricted communication to the emulated user equipment via a beam signal corresponding to the predefined SS block.

In one example of the system, the beamforming test engine is configured to transmit, via an uplink channel to the DUT, a sounding reference signal (SRS) signal that is fabricated in accordance to the beam model and wherein the DUT sends a follow-up beam switch indication message to the emulated user equipment in response to receiving the fabricated SRS signal.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by a processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for testing and modeling the beamforming capabilities of a device under test gNB are provided. In some embodiments, the disclosed subject matter allows a user (e.g., a test administrator) to formulate and submit (as test system device input) a beam model that predefines the beam indices (e.g., beam identifiers) to be selected and provided to a gNB DUT over a period of time. In lieu of physical use equipment devices reporting actual beam reference signal receiving power (BRSRP) values to a gNB, the testing system device utilizes predefined signal strength values (e.g., predefined and/or fabricated BRSRP values) that are specified in the beam model as the reported values. As such, the gNB being tested will respond to the fabricated user equipment beam signal strength report values and execute a corresponding servicing beam switch to the UE. In some embodiments, the testing can be conducted using user equipment emulations managed by the testing system device. For example, testing can be initiated by inputting a user's beam models into the emulated user equipment's lower layer where the emulated user equipment will transmit the beam index (BI) values and associated fabricated signal strength power to the gNB DUT. In response, the gNB DUT will receive these values and switch to the related serving beam reported by the testing system via the emulated UE. The disclosed test system will also generate a textual and/or graphical report in order to indicate the serving beams used by the gNB DUT in the communication over the time. Such reports can be used by a test administrator to validate a gNB DUT and the performance of its corresponding beam tracking and switching algorithms.

As used herein, a "beam" includes an electromagnetic wave radiation pattern or a specially concentrated signal that is formed by an antenna array (e.g., multiple antennas of a gNB) and can be communicated directly to a UE at a particular frequency and direction with a limited geographic covering area.

Reference will now be made in detail to exemplary embodiments of the present invention, examples of which are illustrated in the accompanying drawings. Wherever possible, the same reference numbers will be used throughout the drawings to refer to the same or like parts.

Figure 1:
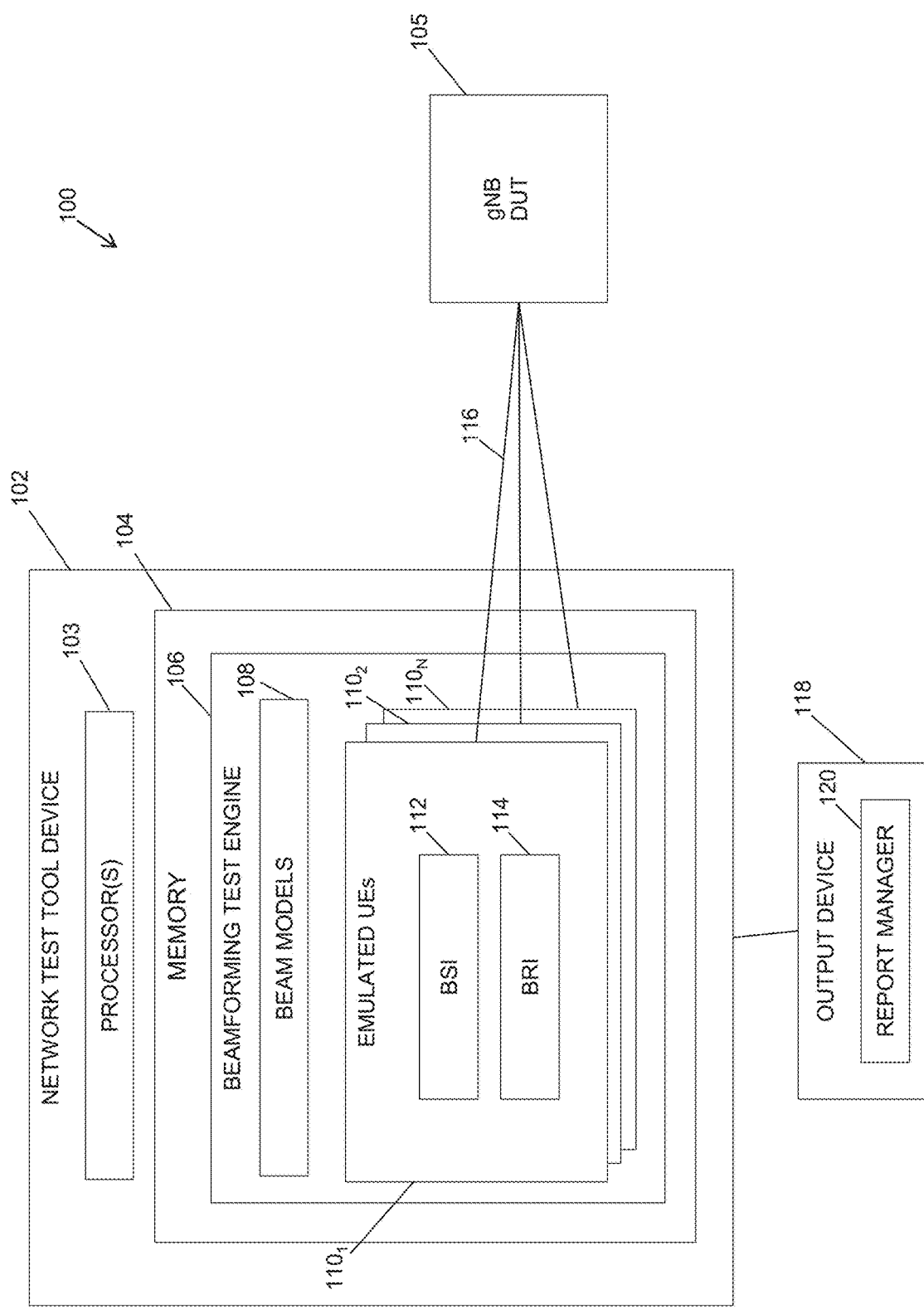
FIG. 1 is a block diagram illustrating an exemplary system for testing and modeling the beamforming capabilities of a gNB element using BSI according to an embodiment of the subject matter described herein.

FIG. 1 illustrates of a block diagram of a test environment network 100. A logical architecture of test environment network 100 is depicted in FIG. 1 as comprising a network test tool device 102 and gNB device under test (DUT) 105. Although FIG. 1 depicts a gNB as the device under test, other base stations or systems capable of utilizing beamforming and transmitting signals via massive MIMO may be tested without departing from the scope of the disclosed subject matter. In some embodiments, network test tool device 102 may include one or more processors 103 and a memory 104 that are collectively utilized to support a beamforming test engine 106 and a plurality of emulated user equipment 110. In some embodiments, processor(s) 103 may include a central processing unit (e.g., a single core or multiple processing cores), a microprocessor, a microcontroller, a network processor, an application-specific integrated circuit (ASIC), or the like. Likewise, memory 104 may comprise random access memory (RAM), flash memory, a magnetic disk storage drive, and the like. In some embodiments, memory 104 may be configured to store beamforming test engine 106 and/or emulated user equipment 110.

In some embodiments, network test tool device 102 and/or beamforming test engine 106 is configured to receive messages and instructions from a client application or a test console utilized by a test administrator. In some embodiments, the test console (not shown in FIG. 1) of the network test tool device 102 includes a test console element that can be presented to a user or test administrator in the form of a graphical user interface (GUI). In alternate embodiments, the test console may be communicatively connected to network test tool device 102 via a wired or wireless connection. Using the test console, the system administrator can issue instructions and/or beam models that define a test case for testing a gNB or other DUT in test environment network 100. For example, the instructions provided by the system administrator can include a beam model 108 that includes predefined beam state information (BSI) that comprises a plurality of beam indices (BI) representative of a plurality of predefined beam signals (e.g., BRS signals, BRRS signals, etc.). The BSI contained in the beam model 108 further includes a predefined and/or fabricated signal strength (or received power) value for each of the plurality of predefined beam signals. In some embodiments, network test tool device 102 can display a user interface that can be utilized by a test administrator to design or select the plurality of beam signals and corresponding signal strengths for conducting the beamforming testing. In some embodiments, the generation and presentation of such a screen display is supported by beamforming test engine 106.

Referring back to FIG. 1, network test tool device 102 is communicatively connected to gNB DUT 105 via a wired connection 116. In other alternate embodiments, connection 116 is a wireless connection. Once gNB DUT 105 and network test tool device 102 are coupled via connection 116, a test administrator or a tester can provide a beam model 108 to network test tool device 102 which is subsequently provisioned to beamforming test engine 106. The beam model 108 can also define the number of emulated user equipment devices (e.g., emulated user equipment $110_{1 \ldots N}$) that is to be utilized for the testing of gNB DUT 105. Further, each of the emulated user equipment 110 maintains and reports BSI set 112 that includes a candidate set of 4 beams to gNB DUT 105. As mentioned above, BSI set 112 is based on fabricated received power measurements of BRS signals and is reported to gNB DUT 105 as BI and BRS received power (or signal strength) data. As used herein, signal strength or receiving power may be measured using signal-noise ratio measurements, decibel measurements, dBm measurements, Watt(s) measurements, and the like.

FIG. 1 further depicts a plurality of emulated user equipment $110_{1 \ldots N}$ as a component of beamforming test engine 106 and is similarly stored in memory 104 of network test tool device 102. Each of the emulated user equipment 110₁ ... ₙ includes its own BSI set 112 and BRI set 114 at a given time that can be utilized in the testing of gNB DUT 105. In some embodiments, an output device 118 can be communicatively connected to network test tool device 102. Output device 118 can include a report manager 120 that is responsible for generating a textual and/or graphical report that indicates the validation or performance results of tested DUT 105, statistics of tested DUT 105, and how the beam moved over time with relation to tested DUT 105.

In order to send and receive data needed for testing gNB DUT 105, emulated user equipment 110 must first establish a connection by acquiring a beam transmitted by gNB DUT 105. For test purposes, gNB DUT 105 can be configured to execute a beam sweeping function that involves the periodic transmission of beams at different angles (e.g., by transmitting a plurality of BRS signals). After receiving one or more of the plurality of BRS signals via connection 116, emulated user equipment 110 is triggered to utilize predefined BSI set 112. Specifically, emulated user equipment 110, maintains a candidate beam set (i.e., BSI set 112) containing information related to a plurality of beams. Notably, BSI set 112 contains parameters of the BRS signal associated with each candidate beam transmitted by an antenna element of gNB DUT 105. For example, the beam state information includes the beam reference signal received power (BRSRP) for each beam index (that identifies the BRS signal and/or beam). In the context of the disclosed subject matter, each of emulated user equipment 110₁ ... ₙ receives a unique beam model 108 from beamforming test engine 106 that may include predefined signal strength values (e.g., BRSRP values) that are fabricated/selected by a test administrator. Namely, these predefined signal strength values are unrelated to and independent from the actual signal strengths associated with the BRS signals received from gNB DUT 105 via connection 116. In some embodiments, emulated user equipment 110 reports the predefined BSI set 112 to gNB DUT 105 via a physical uplink control channel (xPUCCH) or a physical uplink shared channel (xPUSCH) in response to receiving the plurality of BRS signals.

In the above beam acquisition procedure, the optimal direction for the gNB DUT 105 to transmit, and the emulated user equipment 110 to receive, is determined. In the subsequent beam refinement procedure, the wider beam or direction is narrowed down or refined by gNB DUT 105. Notably, gNB DUT 105 transmits narrower beams only in the direction previously determined in the beam acquisition procedure. This means the best angular direction for gNB DUT 105 to transmit (and emulated user equipment 110 to receive) is refined to a finer granularity. The gNB DUT 105 may use the same refined beam for both transmit and receive and instruct emulated user equipment 110 to use the same beam for transmit and receive. The narrower beam is identified by a beam refinement reference signal (BRRS) index. Beam refinement is conducted in a dedicated mode when emulated user equipment 110 has already provided the BSI set to gNB DUT 105 and after gNB DUT 105 sends a BRRS signal to emulated user equipment 110. In some embodiments, the transmission of a BRRS signal is triggered by gNB DUT 105 sending a beam switch indication message or by emulated user equipment requesting gNB DUT 105 to send a BRRS signal via a scheduling request (SR) message.

Figure 2:
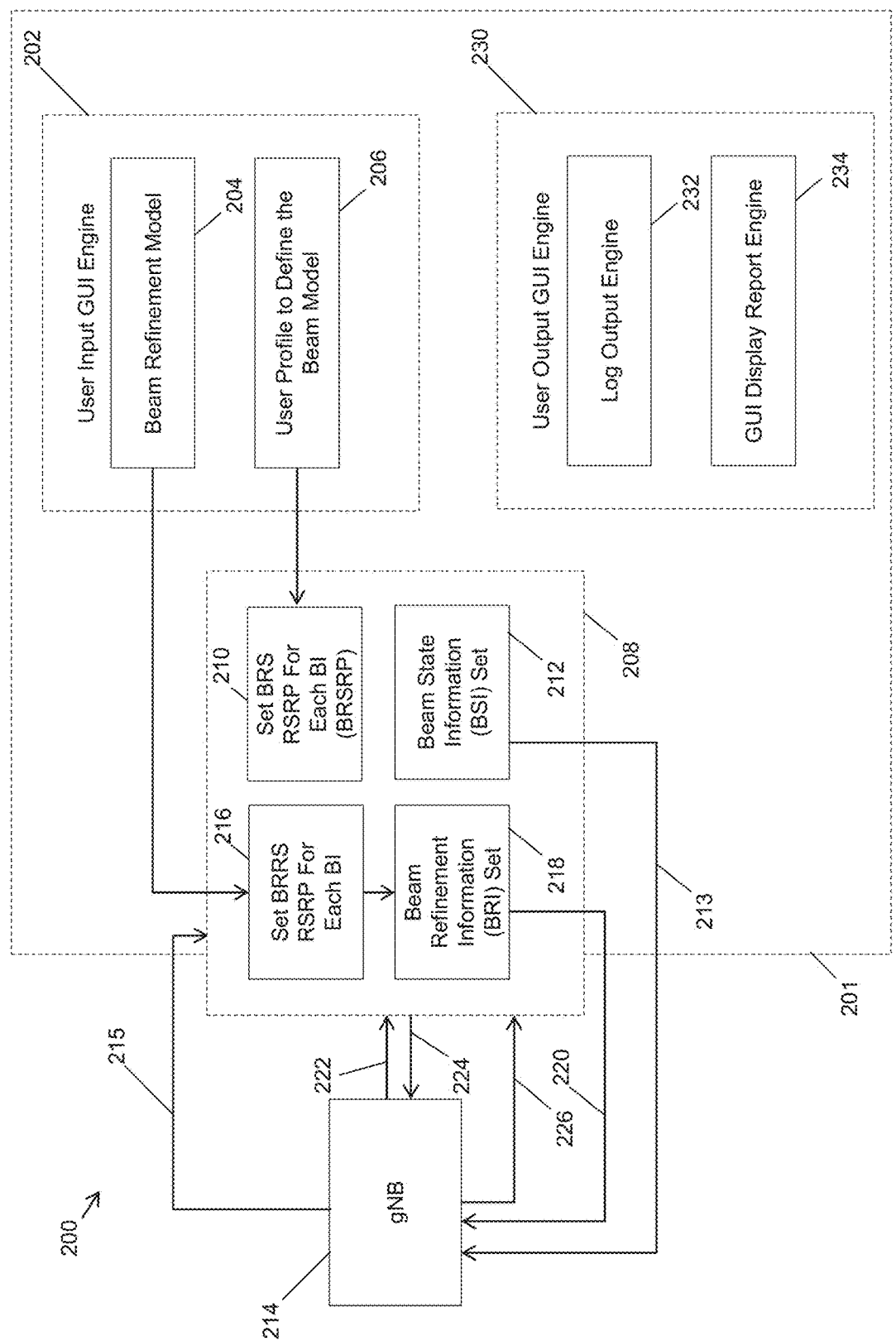
FIG. 2 is a block diagram illustrating a flow chart for testing and modeling the beamforming capabilities of a gNB element using BSI according to an embodiment of the subject matter described herein.

FIG. 2 is a block diagram illustrating a flow chart for testing and modeling the beamforming capabilities of a gNB element using BSI according to an embodiment of the subject matter described herein. FIG. 2 illustrates a test environment 200 comprising a gNB DUT 214 and a network test tool device 201 comprising an emulated user equipment 208, a user input graphical user interface (GUI) engine 202 and a user output GUI engine 230. In some embodiments, emulated user equipment 208, a user input GUI engine 202 and a user output GUI engine 230 are elements stored in memory and executed by one or more processors of network test tool device 201. At the start of a testing session conducted by network test tool device 201, gNB DUT 214 is configured to send system information 215 that includes a frequency and time slot mapping of the various reference signals (e.g., BRS signals) that are to be sent by gNB DUT 214 to emulated user equipment 208. Notably, system information 215 serves to inform the emulated user equipment the frequencies and/or time slots in which to monitor for forthcoming BRS signals. This system information 215 is typically provided from a gNB when a user equipment device is activated or turned on. In some embodiments, system information 215 may also include BRS configuration information, BRS transmission period information, and DUT antenna position information. Notably, the system information provides the user equipment with data that tells the UE when to expect SS blocks from the gNB DUT and how the SS blocks are mapped to beams transmitted from the gNB DUT. The system information includes configuration data that can be used to configure the UE for an established connection.

Using system information 215, the emulated user equipment 208 can also utilize the previously received beam model information to establish the BRS receiving power values for a plurality of forthcoming BRS signals. Notably, after providing the system information to network test tool device 201, gNB DUT 214 is configured to send a plurality of BRS signals (not shown) to emulated user equipment 208 in network test tool device 201 (e.g., via a wired connection). After receiving the BRS signals from gNB DUT 214, emulated user equipment 208 is triggered to provide the fabricated signal strength information in the BSI set 212 to gNB DUT 214. Further, emulated user equipment 208 maintains and reports a BSI set 212 including a candidate set of beams to gNB DUT 214. As mentioned above, the BSI set is based on the predefined signal power values specified in the beam model (as opposed to the signal power measurements of BRS signals actually received from gNB DUT 214). The BSI set 212 can be reported to gNB DUT 214 as BI and BRS received power (or signal strength). In some embodiments, BSI set 212 can be provided to gNB DUT 214 in a report message 213. For example, emulated user equipment 208 can report the BSI set 212 to gNB DUT 214 using either xPUCCH or xPUSCH. When reporting BSI set 212 on xPUCCH, emulated user equipment 208 reports BSI for the beam associated with the highest BRS received power (or signal strength) of all the beams in the candidate beam set (e.g., a prefabricated BSI set). Alternatively, when the emulated user equipment 208 reports BSI on xPUSCH, the emulated user equipment reports BSI for one, two, or four beams (as determined by the two-bit BSI request from the DUT) with the highest BRS received power (or signal strength) of the beams in the candidate beam set. In some embodiments, gNB DUT 214 is configured to use the candidate beam set to monitor additional beams (other than the beam with the highest signal strength). Notably, gNB DUT 214 may be allowed to designate the beam with the second highest signal strength instead of the beam with the highest signal strength. Further, gNB DUT 214 may be configured to use more than one beam from the beams reported in the candidate beam set to determine or estimate the UE's present signaling capabilities and/or location and act accordingly.

After receiving BSI set 212 from emulated user equipment 208 (in report message 213), gNB DUT 214 is configured to switch the current serving beam directed to emulated user equipment 208 to a beam that corresponds to the highest BRS received power value indicated in BSI set 212. Further, gNB DUT 214 is configured to send a beam switch message 226 to emulated user equipment 208 that serves as a confirmation that the beam has been switched to the beam indicated by the previously provided BSI set. In some embodiments, beam switch message 226 is a downlink control information (DCI) message or a MAC-CE based message.

After receiving beam switch message 226, emulated user equipment 208 may send a schedule request (SR) message 224 to gNB DUT 214 to request BRRS messaging. In response, gNB DUT 214 is configured to transmit a plurality of BRRS signals to emulated user equipment 208.

After receiving the BRRS signals (not shown) from gNB DUT 214, the emulated user equipment 208 is triggered to provide the fabricated signal strength information (e.g., BRRS received power) in BRI set 218 to gNB DUT 214. Further, emulated user equipment 208 maintains and reports a BRI set 218 that includes a candidate set of beams to the gNB DUT 214. As mentioned above, BRI set 218 is based on the predefined signal power values specified in the beam refinement model 206 (instead of the actual signal power measurements of BRRS signals received from the gNB DUT 214). The BRI set 218 can be reported to gNB DUT 214 as BIs and related BRRS received power (or signal strength). For example, the BRI set 218 can be provided to gNB DUT 214 in a report message 220.

After receiving BRI set 218 from emulated user equipment 208 (in report message 220), gNB DUT 214 is configured to switch the current serving beam directed to the emulated user equipment 208 to a refined beam that corresponds to the highest BRRS received power value indicated in the BRI set. Further, gNB DUT 214 is configured to send a beam switch message 222 to emulated user equipment 208 that serves as a confirmation that the refined beam has been switched to the channel indicated by the previously provided BRI set 218.

As mentioned above, network test tool device 201 may comprise a user input GUI engine 202. In some embodiments, user input GUI engine 202 can receive and/or be configured with spatial mapping information that relates spherical coordinates (e.g., azimuth and elevation coordinates, latitude and longitude coordinates, etc.) or cartesian coordinates (e.g., GPS coordinates) to the gNB DUTs beam index matrix (as defined in system information 215). As such, user input GUI engine 202 allows a test administrator to specify a sequence of movements for emulated user equipment 208 to follow over a predefined time period, where the emulated user equipment movements are defined with respect to the physical coordinate system. In some embodiments, the underlying beamform test engine effectively translates the temporal sequence of physical coordinates of the emulated UE's simulated location into lists of "optimal" BRS beam index values and/or BRRS beam index values (e.g., included in the BSI and BRI sets).

In some embodiments, user input GUI engine 202 may depict a geographic or spatial map that includes a representation of gNB DUT 214 and the emulated user equipment 208. A test administrator can use a computer mouse device to select and drag the emulated user equipment 208 around the gNB DUT in three-dimensional space, effectively designating a user equipment movement path that is to be followed over an interval of time specified by the test administrator. At runtime, network test tool device 201 (and/or a beamforming test engine) converts the user equipment path into the equivalent time-based sequence of BRS and/or BRRS beam index values that are to be presented to gNB DUT 214 during the course of the test run. In response to presenting the gNB DUT 214 with the temporal sequence of BRS and/or BRRS beam index values, network test tool device 201 (e.g., beamforming test engine and/or emulated user equipment 208) observes the gNB DUTs response on the downlink control channel in order to confirm that gNB DUT 214 has directed the serving beam signal to the re-positioned emulated user equipment 208.

Similarly, network test tool device 201 is described above as including a user output GUI engine 230. User output GUI engine 230 includes a log output 232 that includes any element that is configured to provide textual output of the test results. In addition, user output GUI engine 230 includes a GUI display report manager 234 that is configured to display graphical depictions, such as time and position plots, of the test results.

Figure 3:
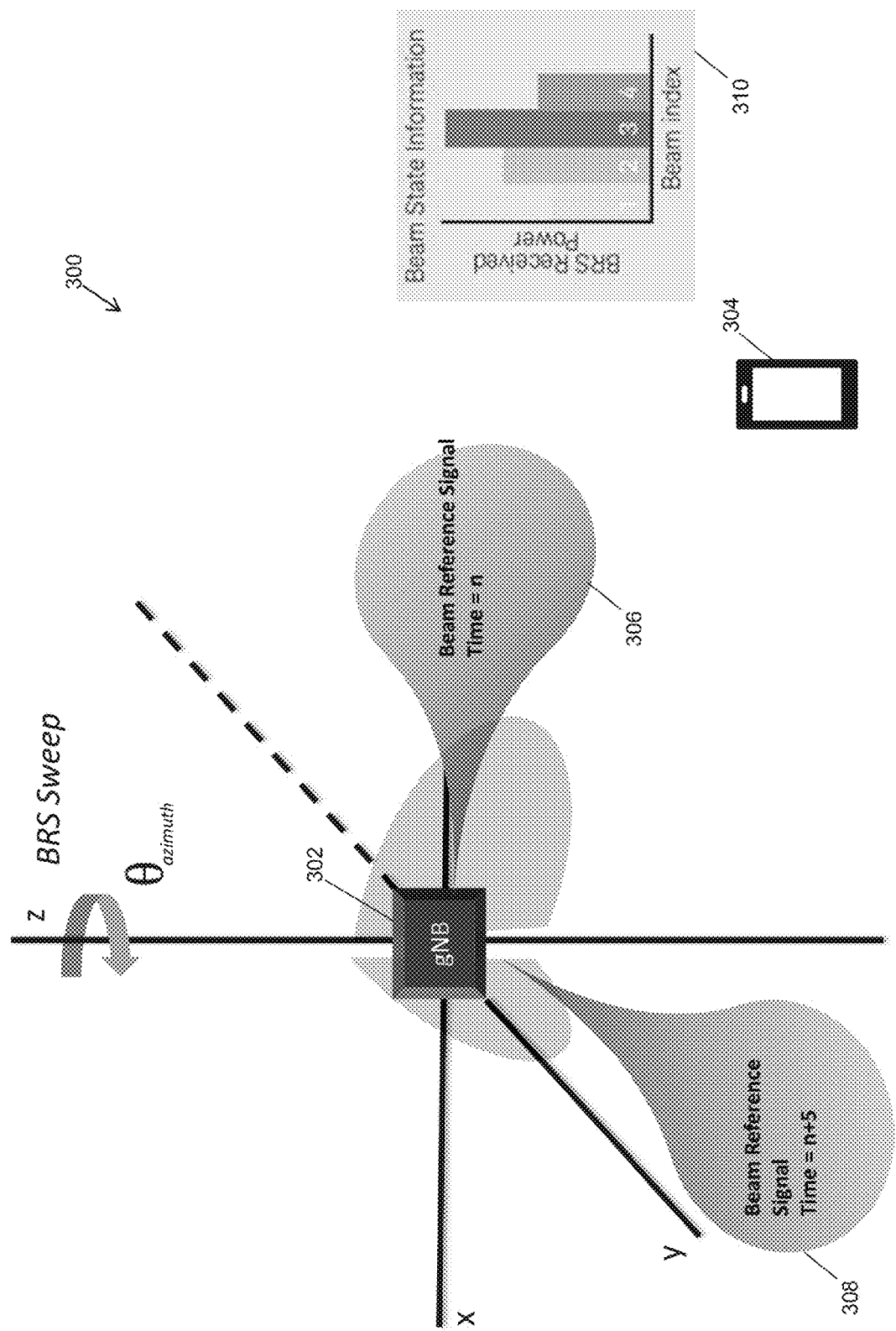
FIG. 3 is a diagram illustrating an exemplary beam acquisition stage used for testing and modeling the beamforming capabilities of a gNB element according to an embodiment of the subject matter described herein.

FIG. 3 depicts an exemplary illustration of a beam acquisition process executed by a gNB 302. Although FIG. 3 and related FIG. 4 below respectively depicts exemplary beam acquisition and refinement processes by determining a longitudinal/azimuthal beam angle for the BRS signal and subsequently determining a latitudinal beam for the BRRS signal angle, other refinement techniques (e.g., finding a narrower beam within a wider plane) may be used without departing from the scope of the claimed subject matter.

In particular, FIG. 3 illustrates a gNB 302 that is configured to transmit a plurality of BRS signals at various time slots to a user equipment 304. For example, FIG. 3 illustrates gNB 302 transmitting a BRS signal 306 at time=n and a BRS signal 308 at time=n+5. In this particular embodiment, gNB 302 is attempting to transmit the BRS signals in a common x-y plane (e.g., BRS signal 306 along the x-axis and BRS signal 308 along the y-axis) around the z-axis. Although only two BRS signals are shown, additional BRS signals may be transmitted without departing from the scope of the disclosed subject matter. The objective of the example beam acquisition stage as depicted in FIG. 3 is to determine the best azimuthal beam angle available to the user equipment (i.e., to find the best available angle about the z-axis). In response to receiving the BRS signals, emulated user equipment 304 is configured to generate a BSI set 310, which includes the beam index for at least one to four of the BRS signals received from gNB 302. Although emulated user equipment 304 is capable of generating BSI set 310 for reporting the BRS received power and beam indices of a plurality of received BRS signals, the disclosed network test tool device 102 and/or beamforming test engine 106 (shown in FIG. 1) is instead configured to generate a fabricated BSI set 310 that contains a predefined number of beam indices and a corresponding number of predefined beam received power (e.g., beam strength) values.

Figure 4:
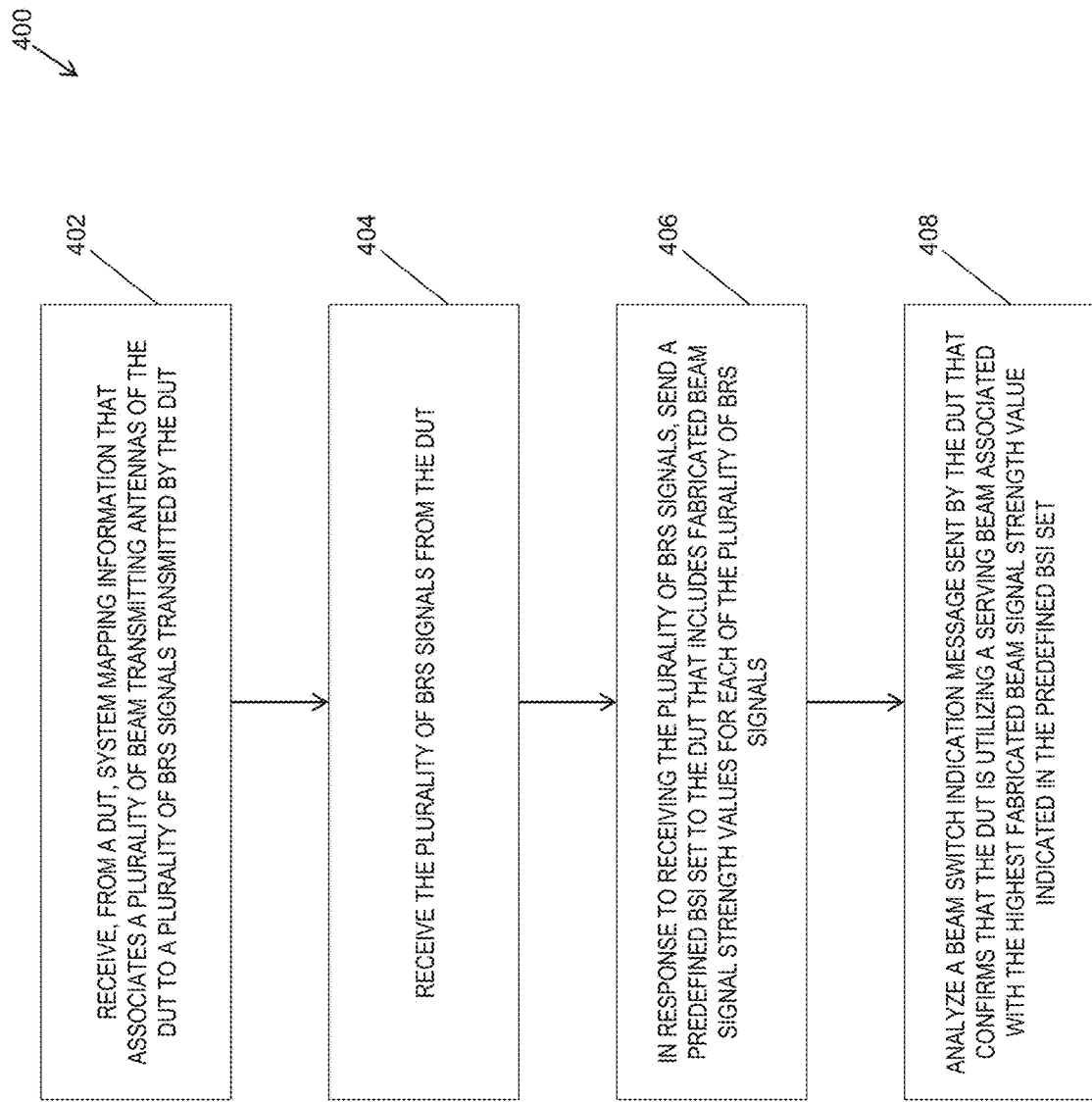
FIG. 4 is a flow chart illustrating an exemplary process for testing and modeling the beamforming capabilities of a gNB element using beam signaling information according to an embodiment of the subject matter described herein.

FIG. 4 is a flow chart illustrating an exemplary method 400 for testing and modeling the beamforming capabilities of a gNB element according to an embodiment of the subject matter described herein. In some embodiments, blocks 402-408 of method 400 may represent an algorithm performed by a beamforming test engine that is stored in memory and executed by one or more processors of a network test tool device.

In block 402, method 400 includes receiving, from a DUT, system information that associates a plurality of beam transmitting antennas of the DUT with a plurality of BRS signals transmitted by the DUT. In some embodiments, the system information is provided to the user equipment by a gNB DUT when the user equipment is activated in the test environment. The system information can include mapping data that correlates resource information (e.g., time slots and frequencies) to each of the plurality of serving beams transmitted by the antenna array of the DUT.

In block 404, method 400 includes receiving the plurality of BRS signals from the DUT. In some embodiments, the emulated user equipment receives the BRS signals transmitted from the gNB DUT via a test connection (e.g., connection 116 in FIG. 1). Notably, the emulated user equipment may receive one or more of the BRS signals at different times and/or at different frequencies.

In block 406, method 400 includes, in response to receiving the plurality of BRS signals, sending a predefined BSI set to the DUT that includes the fabricated beam signal strength values for each of the plurality of BRS signals. In some embodiments, the emulated user equipment is triggered to send a predefined BSI set to the gNB DUT in response to receiving the BRS signals. Namely, the signal strength information (e.g., BRS received power values) included in the predefined BSI set is fabricated based on parameters included in beam models provided to the test device by a test administrator. Further, the signal strength information included in the BSI set is unrelated to the actual signal strength of the BRS signals received from the gNB DUT. In some embodiments, the BSI set is sent to the gNB DUT in a report message via either xPUCCH or xPUSCH.

In block 408, method 400 includes analyzing a beam switch indication message sent by the DUT to confirm that the DUT is utilizing a serving beam associated with the highest fabricated beam signal strength value indicated in the predefined BSI set. In some embodiments, the emulated user equipment receives a beam switch indication message from the gNB DUT as either a DCI message or a MAC-CE control message. After receiving the message, the beamforming test engine and/or the emulated user equipment can analyze the contents of the beam switch indication message to determine if the serving beam on which the gNB DUT is transmitting corresponds to the beam index associated with the BRS with the highest receiving power as indicated in the predefined BSI set (e.g., provided in block 406) and as per the beam model.

In a second embodiment of the disclosed subject matter, the concept of synchronization signal (SS) block and burst has emerged for the periodic synchronization signal transmission from the gNBs to the user equipment (i.e., downlink measurements). As used herein, an SS block is a group of 4 OFDM symbols in time and 240 subcarriers in frequency (i.e., 20 resource blocks). An SS block carries the primary synchronization signal (PSS), the secondary synchronization signal (SSS), and the physical broadcast channel (PBCH) information. The Demodulation Reference Signal (DMRS) associated with the PBCH can be used to estimate the Reference Signal Received Power (RSRP) of the SS block. In a slot of 14 symbols, there are two possible locations for SS blocks: symbols 2-5 and symbols 8-11. For example, the SS blocks are grouped into the first 5 milliseconds (ms) of an SS burst, which can have different periodicities (TSS). When accessing the network for the first time, the user equipment should assume a periodicity TSS=20 milliseconds. The maximum number (L) of SS blocks in a burst is frequency-dependent, and above 6 GHz there could be up to 64 blocks per burst. When considering frequencies for which beam operations are required, each SS block can be mapped to a certain angular direction. To reduce the impact of SS transmissions, SS blocks can be sent through wide beams, while the data transmission for the active user equipment is usually performed through narrow beams in order to increase the gain produced by beamforming. For connected mode and tracking mode, CSI-RS is used. In some embodiments, CSI signal quality is derived by averaging the signal quality from the NCSI,RX best beams among all the available beams.

Likewise, sounding reference signals (SRSs) are used to monitor the uplink channel quality. As referenced herein, SRSs are transmitted by the user equipment to the gNB. SRS transmission is scheduled by the gNB to which the user equipment is attached. The gNB also signals to the user equipment the resource (e.g., frequency and/or time slot) and direction to use for the transmission of the SRS. The user equipment may be configured with multiple SRSs for beam management. Each resource may be periodic (i.e., configured at the time slot level), semi-persistent (i.e., also at the time slot level, but the resource can be activated or deactivated with messages from the gNB), or a-periodic (i.e., the SRS transmission is triggered by the gNB). The SRSs can span 1 to 4 OFDM symbols as well as a portion of the entire bandwidth available at the user equipment.

The NR specifications include a set of basic beam-related procedures for the control of multiple beams at frequencies above 6 GHz and the related terminologies. The different operations are categorized under the term beam management, which is composed of four different operations i) beam sweeping, ii) beam measurement, iii) beam determination, and iv) beam reporting. As used herein, beam sweeping includes covering a spatial area with a set of beams transmitted and received according to pre-specified intervals and directions and beam measurement comprises the evaluation of the quality of the received signal at the gNB or at the user equipment. Different metrics can be used. One measure is the RSRP (Reference Signal Received Power), which is the average of the received power on synchronization signals. Likewise, beam determination pertains to the selection of the suitable beam or beams either at the gNB or at the user equipment (according to the measurements obtained with the beam measurement procedure) while beam reporting refers to the procedure used by the user equipment to send beam quality and beam decision information to the Radio Access Network (RAN).

Figure 5:
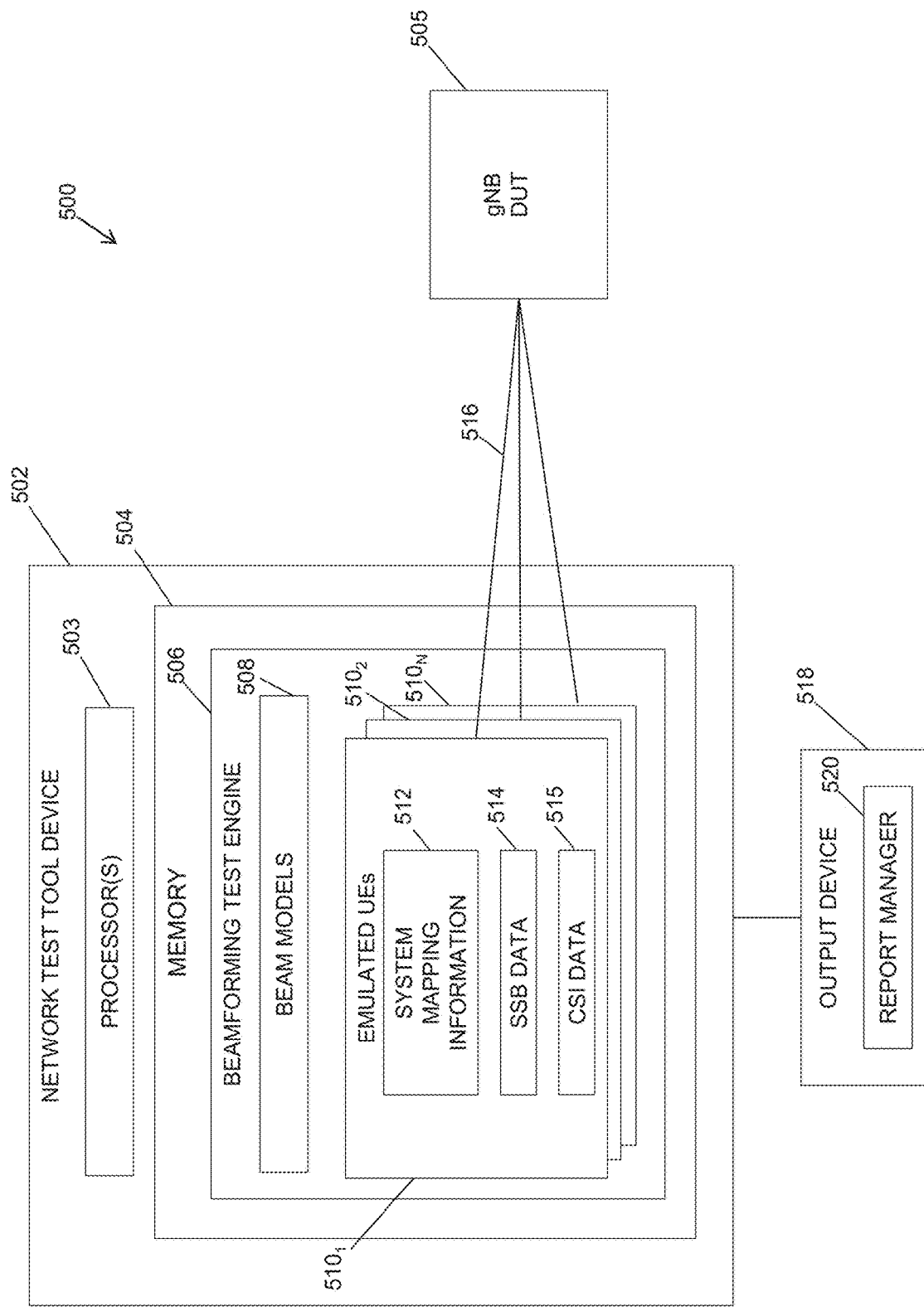
FIG. 5 is a block diagram illustrating an exemplary system for testing and modeling the beamforming capabilities of a gNB element using synchronization signal blocks (SSB) according to an embodiment of the subject matter described herein.

FIG. 5 illustrates a block diagram of a test environment network 500. A logical architecture of test environment network 500 is depicted in FIG. 5 as comprising a network test tool device 502 and gNB DUT 505. Although FIG. 5 depicts a gNB as the device under test, other base stations or systems capable of transmitting signals via MIMO may be tested without departing from the scope of the disclosed subject matter. In some embodiments, network test tool device 502 may include one or more processors 503 and a memory 504 that are collectively utilized to support a beamforming test engine 506 and a plurality of emulated user equipment 510. In some embodiments, processor(s) 503 may include a central processing unit (e.g., a single core or multiple processing cores), a microprocessor, a microcontroller, a network processor, an application-specific integrated circuit (ASIC), or the like. Likewise, memory 504 may comprise random access memory (RAM), flash memory, a magnetic disk storage drive, and the like. In some embodiments, memory 504 may be configured to store beamforming test engine 506 and/or emulated user equipment 510.

In some embodiments, network test tool device 502 and/or beamforming test engine 506 is configured to receive messages and instructions from a client application or a test console utilized by a test administrator. In some embodiments, the test console (not shown in FIG. 1) of the network test tool device 502 includes a test console element that can be presented to a user or test administrator in the form of a graphical user interface (GUI). In alternate embodiments, the test console may be communicatively connected to network test tool device 502 via a wired or wireless connection. Using the test console, the system administrator can issue instructions and/or beam models that define a test case for testing a gNB or other DUT in test environment network 500. For example, the instructions provided by the system administrator can include one or more beam models 508 that includes a plurality of SS blocks that corresponds to the beam indexes and/or associated SS blocks indicated in the system information 512). The data contained in the beam model 508 further includes a predefined and/or fabricated signal strength (or received power) value for each of the plurality of predefined beam signals corresponding to the SS blocks. In some embodiments, network test tool device 502 can display a user interface that can be utilized by a test administrator to design or select the plurality of beam signals and corresponding signal strengths for conducting the beamforming testing. In some embodiments, the generation and presentation of such a screen display is supported by beamforming test engine 506.

Network test tool device 502 is also communicatively connected to gNB DUT 505 via a wired connection 516. In other alternate embodiments, connection 516 is a wireless connection. Once gNB DUT 505 and network test tool device 502 are coupled via connection 516, a test administrator can provide beam models 508 to network test tool device 502 which is subsequently provisioned to beamforming test engine 506. The beam models 508 can also define the number of emulated user equipment devices (e.g., emulated user equipment $510_{1 \ldots N}$) that is to be utilized for the testing of gNB DUT 505.

As mentioned above, beam model 508 includes data that is based on fabricated received power measurements of SS blocks (e.g., SS block power measurement data values 514) and is reported to gNB DUT 505 as uplink messages that indicate received power (or signal strength) data. Similarly, in addition to fabricated SS block power measurement data values 514, CSI-RS data values 515 comprises fabricated CSI-RS values that are provided by a user as input via beam model(s) 508. In normal operations, CSI-RS information is a reference signal that is sent by the gNB to the UE for channel monitoring purposes (i.e., in addition to SS blocks). For example, CSI-RS values, along with SS block power measurements, are used by the gNB to determine which beam to use and provide an instruction to switch the UE to the correct beam. In the context of the disclosed subject matter, emulated user equipment 510 will utilize the input beam model 508 and fabricate CSI-RS data values 515 and SS block power measurement data values 514 accordingly and provide these fabricated CSI-RS data values 515 and fabricated SS block power measurement data values 514 to gNB DUT 505. As such, the gNB DUT 505 can utilize the received CSI-RS data values 515 to switch the beam as expected. Notably, CSI-RS data values 515 can be used as a fabricated indication of the quality, strength and/or power of the beam signal received by emulated user equipment 510 from gNB DUT 505. The beam model further includes verification information that can be used by the beamforming test engine to verify that the gNB DUT is operating in accordance to the fabricated SS block and/or CSI-RS information provided by the user equipment to the gNB DUT.

As used herein, signal strength or receiving power may be measured using signal-noise ratio measurements, decibel measurements, dBm measurements, Watt(s) measurements, and the like.

FIG. 5 further depicts a plurality of emulated user equipment $510_{1 \ldots N}$ as a component of beamforming test engine 506 and is similarly stored in memory 504 of network test tool device 502. Each of the emulated user equipment $510_{1 \ldots N}$ includes its own system information 512 and SS block power measurement data values 514 and CSI-RS data values 515 that can be utilized in the testing of gNB DUT 505. In some embodiments, an output device 518 can be communicatively connected to network test tool device 502. Output device 518 can include a report manager 120 that is responsible for generating a textual and/or graphical report that indicates the validation or performance results of tested DUT 505.

In some embodiments, beamforming test engine 506 is configured to utilize a resource index that specifies a location and/or identifier for each of the resources to communicate a SS block that is associated with the greatest signal strength. For example, beamforming test engine 506 is able to access beam model(s) 508 to determine which SS block network test tool device 502 has been instructed to report back to the gNB DUT as the SS block with the greatest signal strength. Notably, beamforming test engine 506 accesses system information 512 which includes mapping data that maps each of the SS blocks to a plurality of resource indices that respectively identify a corresponding resource. As used herein, the term "resource" includes one or more resource elements or group of resource elements or one or more resource blocks in the resource grid of a given bandwidth over time. Similarly, a resource element is the smallest defined unit which may include of one orthogonal frequency division multiplexing (OFDM) subcarrier (e.g., in frequency scale) during one OFDM symbol interval (e.g., in time scale).

For example, a resource may include a grid in a resource block map (e.g., a RACH resource or PRACH resource). As used herein, a 'resource block map' specifies a plurality of frequency and time slots by which the gNB transmits a beam. As such, beamforming test engine 506 (via the emulated UE) can transmit a PRACH message or other signal on the resource corresponding to the fabricated SS block specified by the beam model. The gNB DUT 505 is configured to monitor for PRACH messages transmitted on one or more resources. Upon receiving the PRACH message, the gNB DUT is able to use system information that cross-references/maps resource indices with SS blocks and can subsequently determine the SS block designated as having the greatest signal strength (i.e., based on the resource the PRACH message was received). The gNB DUT then transmits beam signals to the UE based on the designated SS block.

Figure 6:
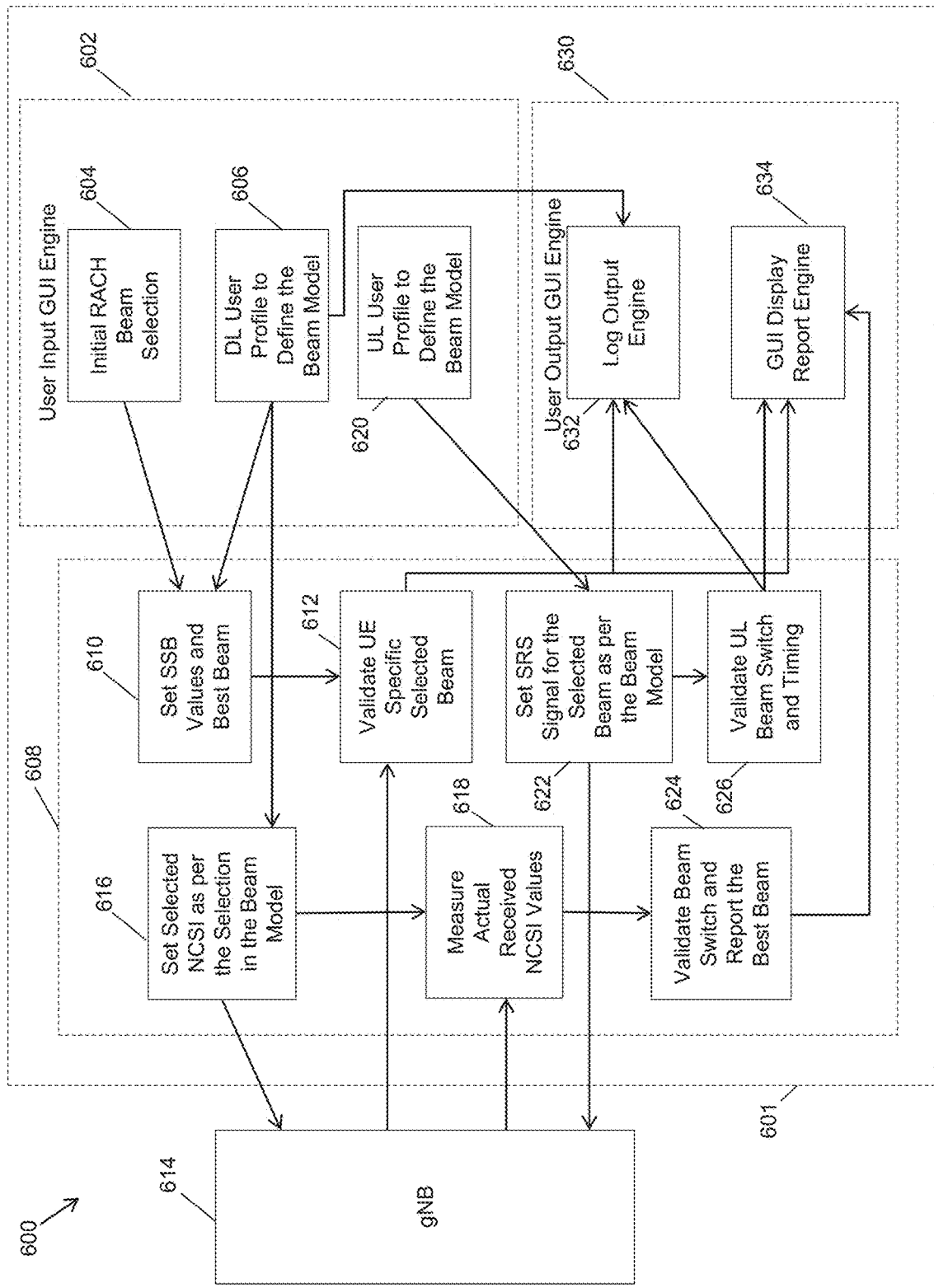
FIG. 6 is a block diagram illustrating a flow chart for testing and modeling the beamforming capabilities of a gNB element using synchronization signal blocks, channel state information reference signals (CSI-RS), and sounding reference signals (SRS) according to an embodiment of the subject matter described herein.

FIG. 6 is a block diagram illustrating a flow chart for testing and modeling the beamforming capabilities of a gNB element using synchronization signal blocks, channel state information reference signals (CSI-RS), and sounding reference signals (SRS) according to an embodiment of the subject matter described herein. FIG. 6 illustrates a test environment 600 comprising a gNB DUT 614 and a network test tool device 601 comprising an emulated user equipment 608, a user input graphical user interface (GUI) engine 602 and a user output GUI engine 630. In some embodiments, emulated user equipment 608, user input GUI engine 602 and user output GUI engine 630 are elements of a beamforming test engine stored in memory and executed by one or more processors of network test tool device 601. At the start of a testing session conducted by network test tool device 601, gNB DUT 614 is configured to send system information that includes resources (e.g., frequency and time slot resources) that are mapped to the various reference signals (e.g., SS blocks and bursts) that are to be sent by gNB DUT 614 to emulated user equipment 608. Notably, the system information serves to inform the emulated user equipment the frequencies and/or time slots in which to monitor for forthcoming SS blocks. This system information is typically provided from a gNB when a user equipment device is activated or turned on. In some embodiments, the system information may also DUT antenna position information.

Referring to FIG. 6, an initial RACH beam selection 604 is established in a beam model provided by user input GUI engine 602. Notably, the RACH beam selection is provided to emulated user equipment 608, which in turn sets SS block values and sets the SS block as the best beam (see block 610). FIG. 6 proceeds to block 612 (as described above) where emulated user equipment 608 then validates the user equipment specific selected beam reported on a RACH response message from gNB DUT 614.

For downlink measurements (e.g., monitoring of downlink channel quality), user input GUI engine 602 permits a user to input a downlink user profile that defines a beam model containing a plurality of predefined SS blocks or beams and corresponding NCSI information (e.g., channel state information for a number of beams equal to "N") for emulated user equipment 608 that is operating in a connected mode (see block 606). For example, the beam model may comprise data that indicates the predefined SS blocks or beams and associated time information that specifies when the predefined SS blocks are to be utilized during a test session. In some embodiments, the NCSI information includes data that is representative of the number of CSI-RS's per beam. The beam model contains information comprising predefined signal power information, and NCSI information that is provided to emulated user equipment 608. In some embodiments, the beam model includes beam indexes that identify the corresponding predefined SS blocks. In block 616, emulated user equipment 608 uses the received beam model to set the selected NCSI value. In particular, emulated user equipment 608 selects the beam index per the beam model and/or sets the selected NCSI to a high value that is above a predefined threshold as per the selection in the beam model at a given time.

Notably, the beamforming test engine is configured to provide the gNB DUT with fabricated CSI values for a subset of received SS blocks for a given time slot. As used herein, "Rx" indicates that the CSI values are typically measured on received SS block signals (including CSI-Rx values) even though in the described test environment, the beamforming test engine fabricates the CSI-RS values based on the beam model provided as input from user. These fabricated CSI-RS values are intended for downlink, but the UE informs the gNB DUT via uplink about the downlink measurements.

More specifically, emulated user equipment 608 sets the unselected NCSI to a value that is under the predefined threshold. Once the NCSI for the selected SS block and beam is established, emulated user equipment 608 reports the selected SS block and NCSI value (an unselected SS blocks and low NCSI values) to gNB DUT 614. In some embodiments, emulated user equipment 608 can make this report periodically or as requested. Notably, emulated user equipment can be configured to continuously measure and report SS block and NCSI information for beam tracking. After gNB DUT 614 receives the NCSI values, gNB DUT 614 returns SS blocks with actual NCSI values, and emulated user equipment 608 is configured to measure the actual received NCSI values received from gNB DUT 614 for all the beams configured (block 618). Continuing to block 624, emulated user equipment 608 is configured to validate a beam switch and its timing. Emulated user equipment 608 is further adapted to report the best beam to user output GUI engine 630. Specifically, user output GUI engine 630 can be configured to utilize a graphical user interface to display the beamforming report to a test administrator using GUI display report engine 634.

For uplink channel communications testing as shown in FIG. 6, user input GUI engine 602 is configured to utilize an uplink user profile to define a beam model (see block 620). The beam model is then provided to emulated user equipment 608 and FIG. 6 proceeds to block 622. Consequently, emulated user equipment 608 is configured to receive the beam model and sets the SRS signal for the selected beam (as designated in the beam model) to be strong at a given transmission time. Likewise, emulated user equipment 608 is configured to set the remaining SRS signals corresponding to the unselected beams as being characterized by low power or as being noisy. At this point in time, emulated user equipment 608 validates the uplink beam switch and timing (in block 626) as well as reporting the predefined SRS signal to gNB DUT 614. In some embodiments, the SRS signal report is conducted by the sending of a RACH message (e.g., PRACH message) from emulated user equipment 608 to gNB DUT 614 on a resource associated with an SS block corresponding to the highest signal power. After receiving the report message, gNB DUT 614 directs the selected beam to emulated user equipment 608 via a random access response (RAR) message. In some embodiments, the RAR message may also be used to confirm that the report message was received from the UE. For example, the gNB can utilize the RAR message as an indication or acknowledgement that the gNB DUT received the emulated UE's beam selection. After receiving the RAR message, emulated user equipment 608 validates the UE-specific selected beam indicated in the RAR message (see block 612). After validating the selected beam, emulated user equipment 608 reports the validated beam to both log output engine 632 and GUI display report engine 634. In addition, after receiving the RAR message, the UE may receive DCI from the gNB DUT which indicates the beam switch.

Figure 7:
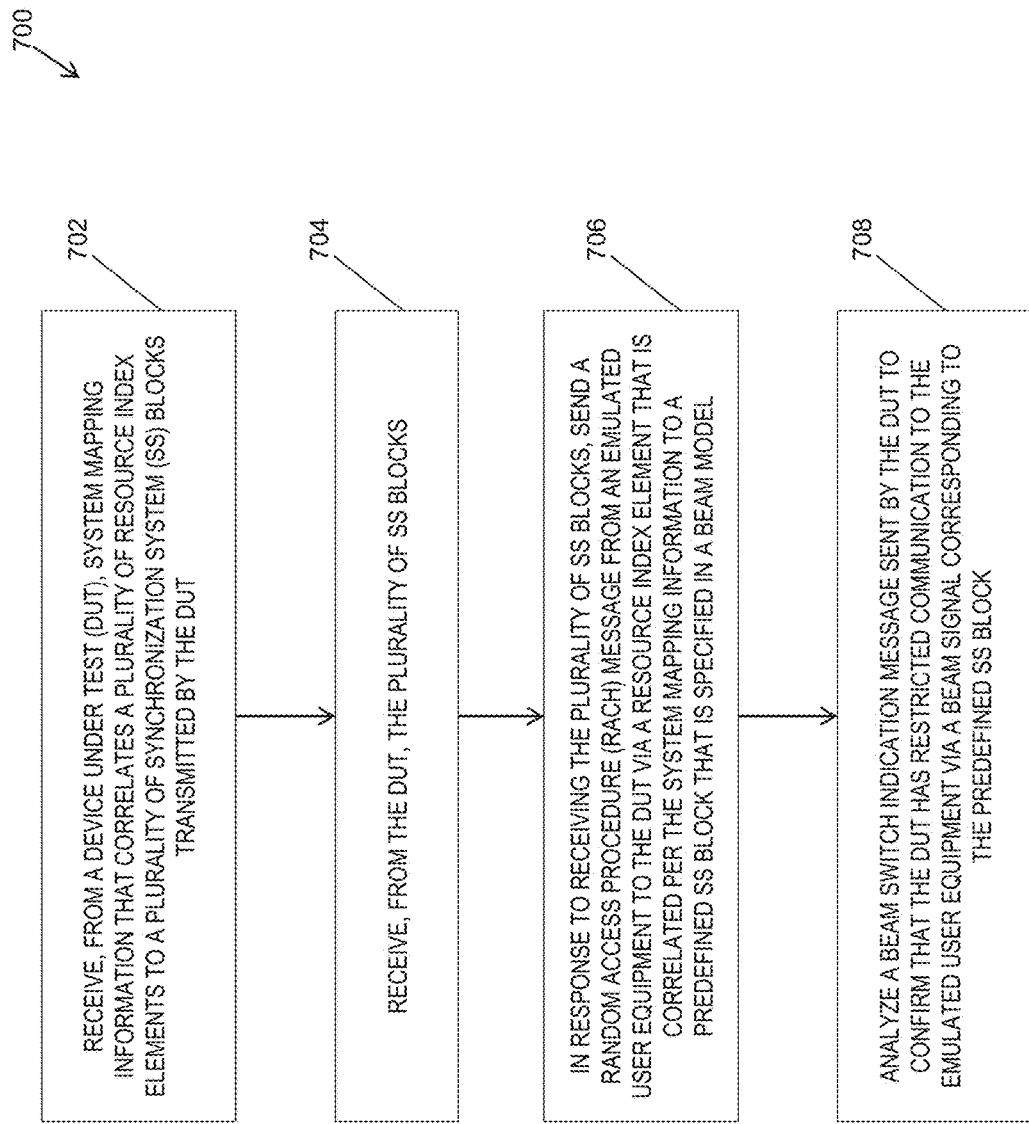
FIG. 7 is a flow chart illustrating an exemplary process for testing and modeling the beamforming capabilities of a gNB element using signaling burst blocks according to an embodiment of the subject matter described herein.

FIG. 7 is a flow chart illustrating an exemplary method 700 for testing and modeling the beamforming capabilities of a gNB element according to an embodiment of the subject matter described herein. In some embodiments, blocks 702-708 of method 700 may represent an algorithm performed by a beamforming test engine that is stored in memory and executed by one or more processors of a network test tool device.

In block 702, method 700 includes receiving, from a DUT, system information that correlates a plurality of resources to a plurality of SS blocks transmitted by the DUT. In some embodiments, at the start of a testing session conducted by network test tool device, a gNB DUT is configured to send system information that includes resources (e.g., frequency and time slot resources) that are mapped to the various reference signals (e.g., SS blocks and bursts) that are to be sent by gNB DUT to an emulated user equipment hosted by the network test tool device. In particular, the system information serves to inform the emulated user equipment the frequencies and/or time slots in which to monitor for forthcoming SS blocks. This system information is typically provided from a gNB when a user equipment device is activated or turned on. In some embodiments, the system information may also DUT antenna position information.

In block 704, method 700 includes receiving, from the DUT, the plurality of SS blocks. In some embodiments, after providing the system information to network test tool device, the gNB DUT is configured to send a plurality of SS blocks to emulated user equipment hosted by network test tool device (e.g., via a wired connection).

In block 706, method 700 includes, in response to receiving the plurality of SS blocks, sending a RACH message from an emulated user equipment to the DUT via a resource that is correlated per the system information to a predefined SS block that is specified in a beam model. Similarly, CSI-RS data and SRS signal information may be similarly sent to the DUT. In some embodiments, after receiving the SS blocks from the gNB DUT, the emulated user equipment is triggered to provide fabricated and/or predefined signal strength information (e.g., as indicated in SRS signal information and CSI-RS data) to the gNB DUT. For example, the SRS signal can be set for the selected beam model as per the beam model. Specifically, the emulated user equipment sends a report message indicating the SS block with the predefined highest signal power to the gNB DUT. As mentioned above, the predefined SS block is based on the predefined signal power value specified in the beam model (as opposed to the signal power measurements of SS blocks actually received from the gNB DUT).

In block 708, method 700 includes analyzing a beam switch indication message sent by the DUT to confirm that the DUT has restricted communication to the emulated user equipment via a beam signal corresponding to the predefined SS block. After receiving the RACH message included in the resource from the emulated user equipment, the gNB DUT is configured to switch the current serving beam directed to the emulated user equipment to a resource (e.g., time slot and/or frequency) that corresponds to the SS block with the highest received power value as indicated by the predefined system information. Further, the gNB DUT is configured to send a beam switch message to the emulated user equipment that serves as a confirmation that the beam has been switched to the channel indicated by the previously provided system information.

It should be noted that each of the network test tool device, beamforming test engine, emulated user equipment, and/or functionality described herein may constitute a special purpose computing device. Further, the network test tool device, beamforming test engine, emulated user equipment, and/or functionality described herein can improve the technological field of computer network equipment testing. More specifically, the disclosed testing system can be configured to operate entirely within a test environment that supports an emulated network. As such, testing and monitoring the manner in which a gNB or similar network element conducts beamforming with a plurality of emulated user equipment largely obviates the need to maintain a physical testing network environment comprising multiple physical user equipment or mobile devices. Consequently, the network test tool device enables a test administrator to subject a gNB DUT to the communication from multiple UEs without having to configure a physical network of mobile devices that are required to generate the necessary user movement and environmental obstructions. It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing and modeling beamforming capabilities of a device under test (DUT), the method comprising:
    receiving, from a DUT, system information that associates a plurality of beam transmitting antennas of the DUT with a plurality of beam reference signals transmitted by the DUT;
    receiving the plurality of beam reference signals from the DUT;
    in response to receiving the plurality of beam reference signals, sending a predefined beam selection information (BSI) set to the DUT that includes fabricated beam signal strength values for one or more of the plurality of beam reference signals; and
    analyzing a beam switch indication message sent by the DUT to confirm that the DUT is utilizing a serving beam associated with a highest fabricated beam signal strength value indicated in the predefined BSI set.

2. The method of claim 1 wherein the fabricated beam signal strengths of the beam reference signals included in the predefined BSI set are specified in a beam model provided as input and are independent of the actual signal strengths of the plurality of beam reference signals received from the DUT.

3. The method of claim 2 comprising receiving a plurality of beam refinement reference signals from the DUT.

4. The method of claim 3 wherein, in response to receiving the plurality of beam refinement reference signals from the DUT, sending a predefined beam refinement information (BRI) set to the DUT indicating a fabricated beam signal strength for each of the plurality of beam refinement reference signals.

5. The method of claim 4 wherein the fabricated beam signal strengths of the beam refinement reference signals included in the predefined BRI set are specified in the beam model and are independent of the actual signal strengths of the plurality of beam refinement reference signals received from the DUT.

6. The method of claim 1 comprising determining that the serving beam indicated in the beam switch indication message matches the serving beam corresponding to the beam reference signal associated with the highest signal strength indicated in the BSI set.

7. The method of claim 1 where a network test tool device comprising at least one processor, a memory, and a beamforming test engine that when stored in memory and executed by the at least one processor is configured to conduct the receiving of the system information, the receiving of the plurality of beam reference signals, the sending of the predefined BSI set, and the analyzing of the beam switch indication message.

8. A method for testing and modeling beamforming capabilities of a device under test (DUT), the method comprising:
    receiving, from a DUT, system information that correlates a plurality of resources to a plurality of synchronization system (SS) blocks transmitted by the DUT;
    receiving, from the DUT, the plurality of SS blocks;

in response to receiving the plurality of SS blocks, sending a random access procedure (RACH) message from an emulated user equipment to the DUT via a resource that is correlated per the system information to a predefined SS block that is specified in a beam model; and analyzing a beam switch indication message sent by the DUT to confirm that the DUT has restricted communication to the emulated user equipment via a beam signal corresponding to the predefined SS block.

9. The method of claim 8 wherein the predefined SS block is characterized by a RACH resource as having the greatest signal strength magnitude among the plurality of SS blocks transmitted by the DUT.

10. The method of claim 8 wherein the resource includes a RACH resource that is defined by at least one of a time slot and a frequency.

11. The method of claim 8 wherein the beam model that specifies the predefined SS block is received as input after the receiving of the system information.

12. The method of claim 8 further comprising i) receiving, from the DUT, system information that correlates the plurality of resources to the plurality of SS blocks and a plurality of CSI-RS signals transmitted by the DUT, ii) receiving the plurality of SS blocks and the plurality CSI-RS signals from the DUT, iii) in response to receiving the plurality of SS blocks and the plurality CSI-RS signals, sending from the emulated user equipment to the DUT, a plurality of fabricated NCSI-Rx values corresponding to the plurality of SS blocks based on the beam model to the DUT via uplink control information that is correlated per the system information to the predefined SS block that is specified in the beam model, and iv) analyzing a second beam switch indication message sent by the DUT to confirm that the DUT has restricted communication to the emulated user equipment via a beam signal corresponding to the predefined SS block.

13. The method of claim 8 comprising transmitting, via an uplink channel from the emulated user equipment to the DUT, a sounding reference signal (SRS) signal that is fabricated in accordance to the beam model.

14. The method of claim 13 wherein the DUT send a follow-up beam switch indication message to the emulated user equipment in response to receiving the fabricated SRS signal.

15. A system for testing and modeling beamforming capabilities of a device under test (DUT) operating in an initial access mode, the system comprising:

a network test tool device comprising at least one processor, a memory, and a beamforming test engine that when stored in memory and executed by the at least one processor is configured for:

receiving, from a device under test (DUT), system information that correlates a plurality of resources to a plurality of synchronization system (SS) blocks transmitted by the DUT;

receiving, from the DUT, the plurality of SS blocks;

in response to receiving the plurality of SS blocks, sending a random access procedure (RACH) message from an emulated user equipment to the DUT via a resource that is correlated per the system information to a predefined SS block that is specified in a beam model; and analyzing a beam switch indication message sent by the DUT to confirm that the DUT has restricted communication to the emulated user equipment via a beam signal corresponding to the predefined SS block.

16. The system of claim 15 wherein the predefined SS block is characterized by the RACH message as having the greatest signal strength magnitude among the plurality of SS blocks transmitted by the DUT.

17. The system of claim 15 wherein the resource includes a RACH resource that is defined by at least one of a time slot and a frequency.

18. The system of claim 15 wherein the beam model that specifies the predefined SS block is received as input after the receiving of the system information.

19. The system of claim 15 wherein the beamforming test engine is further configured to function in a connected mode that includes i) receiving, from the DUT, system information that correlates the plurality of resources to the plurality of SS blocks and a plurality of CSI-RS signals transmitted by the DUT, ii) receiving the plurality of SS blocks and the plurality CSI-RS signals from the DUT, iii) in response to receiving the plurality of SS blocks and the plurality CSI-RS signals, sending from the emulated user equipment to the DUT, a plurality of fabricated NCSI-Rx values corresponding to the plurality of SS blocks based on the beam model to the DUT via uplink control information that is correlated per the system information to the predefined SS block that is specified in the beam model, and iv) analyzing a second beam switch indication message sent by the DUT to confirm that the DUT has restricted communication to the emulated user equipment via a beam signal corresponding to the predefined SS block.

20. The system of claim 15 wherein the beamforming test engine is configured to transmit, via an uplink channel to the DUT, a sounding reference signal (SRS) signal that is fabricated in accordance to the beam model and wherein the DUT sends a follow-up beam switch indication message to the emulated user equipment in response to receiving the fabricated SRS signal.

* * * * *